Patented July 17, 1928.

1,677,730

UNITED STATES PATENT OFFICE.

KARL SATOR AND WILHELM PFANNMÜLLER, OF LUDWIGSHAFEN-ON-THE-RHINE, GERMANY, ASSIGNORS TO I. G. FARBENINDUSTRIE AKTIENGESELLSCHAFT, OF FRANKFORT-ON-THE-MAIN, GERMANY, A CORPORATION OF GERMANY.

MANUFACTURE OF PARAFORMALDEHYDE.

No Drawing. Application filed June 26, 1926, Serial No. 118,845, and in Germany July 2, 1925.

Solid polymeric forms of formaldehyde, so-called paraformaldehyde and similar products, have hitherto been prepared by concentrating aqueous formaldehyde solutions by evaporation with or without the aid of a vacuum or by removing part of the water from aqueous formaldehyde solutions by means of suitable agents such a sulfuric acid. The products are obtained thereby in the state of an aqueous paste or jelly which must be further desiccated in order to obtain a pulverulent product.

We have now found that solid products of any desired consistency and especially non-smeary, dry products can be obtained in a simple manner by removing water from mixtures of vapors of formaldehyde and water, which mixtures may also contain other gases or vapors. For example the gaseous mixture obtained by the catalytic oxidation of methanol may be employed directly. The water can be removed from the gases in any desired manner, for example by absorption by means of water-removing agents, or by cooling or in any other manner. Preferably the water is removed by reducing the temperature of the hot gas mixture as rapidly as possible. Thereby the bulk of the water vapor and part of the formaldehyde are condensed with the formation of an aqueous formaldehyde solution with or without separation of paraformaldehyde. By rapidly removing the aqueous condensate, the uncondensed part of the formaldehyde carried away with the gases is separated as a solid product which, depending on the conditions of working, is either moist or dry at once.

The said rapid cooling with separation and removal of the aqueous condensate can be effected for example by passing the mixture of formaldehyde and water vapor through a cooler in an upward direction and removing the condensate below. The formaldehyde contained in the uncondensed gases separates therefrom in the solid state with a content in water depending on the manner of cooling and the other conditions of working. Thereby all kinds of solid formaldehyde varying in consistency between butter- or tallow-like appearance and dust-like powder, can be obtained in a simple manner. In case a dry product is to be prepared, the formation from the gases is advantageously effected in great chambers which may be provided with scraping or scratching devices, or by means of cooled rollers. The finely divided solid formaldehyde separated from the gas current may also be collected by any other suitable method, for example by filtering or by electric precipitation.

The process here described may be connected directly with the manufacture of formaldehyde by the catalytic oxidation of methanol. The yield of solid formaldehyde is the greater, the smaller the content of the gas mixture leaving the catalyst is in water vapor. Accordingly it is preferable to start from anhydrous or substantially anhydrous methanol and to employ for controlling the temperature of the catalyst, an admixture of inert gases, for example the gases freed from formaldehyde and consisting chiefly of nitrogen. In case only a minor part of the aldehyde is to be prepared in the solid state, the oxidation may of course be effected with dilute methanol, or water vapor may be employed as an inert gas.

In order to avoid separation of solid paraformaldehyde in the aqueous condensate or to obtain a desired concentration of the aqueous solutions, the aqueous condensate may be mixed with water or methanol or other suitable additions.

The solid products obtained in accordance with our present invention possess the advantage of being completely or substantially soluble in water.

The following examples will further illustrate how our invention may be carried out in practice, but the invention is not limited to these examples.

*Example 1.*

Methanol of 80 per cent strength is catalytically oxidized to formaldehyde and the gas mixture leaving the contact vessel which consists of formaldehyde, methanol, water vapor, nitrogen, carbon dioxid &c, is introduced from below into a cooler arranged in inclined direction where it is cooled as far and as rapidly as possible. The condensate formed in the cooler is removed by an overflow. From the upper end of the cooler the uncondensed gases and vapors are introduced into separation chambers, in which the solid product separates out in a finely divided state.

Thereby part of the formaldehyde is obtained as a solid, dust-like product practically completely soluble in water, while the rest of the formaldehyde is found in the condensate and in the waste gases from which it may be removed by washing in any usual manner.

*Example 2.*

Anhydrous methanol is subjected to catalytic oxidation and the resulting gas mixture having a temperature of about 140° C. is passed for cooling in an oblique direction onto the surface of a strongly cooled formaldehyde solution of about 30 per cent strength in the beginning. By a suitable stirrer the surface of the liquid hit by the gases is continuously renewed in order to maintain the cooling action. The gases are rapidly cooled by meeting the surface of the liquid and the bulk of the water and part of the formaldehyde is condensed, while the uncondensed part of the formaldehyde is polymerized totally or partly and is carried away with the gas current from which it may be separated in any desired manner. The level of the cooling liquid is maintained by means of an overflow pipe.

The opening from which the hot gas mixture is passed onto the cooling liquid, may be of any desired shape; for example the gas may be passed through capillary tubes or through slits. The distance of the openings from the surface of the liquid and the direction in which the gas meets the cooling liquid, may also be varied.

The hot gas mixture containing formaldehyde may also be passed through the cooling liquid or both may be brought into contact with each other in any other way, for example by causing both gas and liquid to flow and meet each other in a counter current or in the same direction.

We claim:

1. The process of producing solid polymers of formaldehyde which consists in removing water from gas mixtures comprising formaldehyde and water vapor and separating the solid product from the remaining gases.

2. The process of producing solid polymers of formaldehyde which consists in rapidly cooling gas mixtures comprising formaldehyde and water vapor removing the aqueous condensate and separating the solid product from the gases.

3. The process of producing solid polymers of formaldehyde which consists in catalytically oxidizing methanol, removing water from the resulting gas mixture and separating the solid product from the remaining gases.

4. The process of producing solid polymers of formaldehyde which consists in catalytically oxidizing substantially anhydrous methanol, removing water from the resulting gas mixture and separating the solid product from the remaining gases.

In testimony whereof we have hereunto set our hands.

KARL SATOR.
WILHELM PFANNMÜLLER.